United States Patent Office 2,837,560
Patented June 3, 1958

2,837,560

PREPARATION OF ORGANIC DICARBAMATES

Sidney Beinfest and Phillip Adams, Berkeley Heights, and Joseph Halpern, New Providence, N. J., assignors to Berkeley Chemical Corporation, Berkeley Heights, N. J., a corporation of New Jersey No Drawing. Application January 23, 1956
Serial No. 560,856

10 Claims. (Cl. 260—482)

This invention relates to new and useful improvements in the preparation of organic particularly alkanediol dicarbamates, some of which are novel chemicals.

Alkanediol dicarbamates such as butane 1,3 diol dicarbamate and 2-methyl-2-n-propyl-propane 1,3 diol dicarbamate have been finding increasing utility in the dye industry and for medicinal purposes.

These materials have been prepared in general by an exchange reaction between a diol and ethyl carbamate with a solvent or by reacting a diol with 2 moles of phosgene and then ammonolysis of the bis (chloro carbamate). They have also been prepared by the direct reaction of urea with diols by the utilization of an excess of the latter in the presence of an inert diluent having a boiling point above 200° C.

These processes are characterized in general by excessive costs and unsatisfactory yields. Problems in the purification of the desired materials also arise because of side reactions which lead to a variety of compounds. Simple examples of products arising from an alcohol-urea condensation are: alkyl carbamates, alkyl carbonates, alkyl allophanates and cyanuric acid.

It has now been found that organic particularly alkanediol dicarbamates can be prepared in increased yields and with greater ease of purification by reacting an alkanediol with urea in the presence of a reactive solvent and a catalyst. This method has resulted in addition in the production of several novel chemicals as detailed below.

The equation for the reaction is illustrated below for the preparation of butane 1,3 diol dicarbamate from butane 1,3 diol

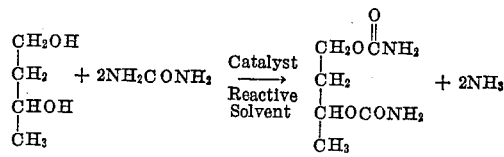

The temperatures utilized are in the range of 100° to 180° C. No pressure apparatus is needed to carry out this reaction.

The alkanediols that can be utilized are those fitting into the general formula

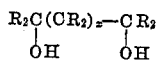

where R is a radical selected from the group consisting of hydrogen, alkyl, cyclic or aryl radicals and $x$ is any number including zero. Where $x$ is 2 or more an alkylene, ethynyl group or a cycle may be used. Typical diols used are butane 1,3 diol, and 2-methyl-2-n-propyl propane 1,3 diol. Other examples are listed below. It is to be understood that the R groups can be the same or different on each of the carbon atoms.

The quantities of reactants employed can follow the stoichiometric relations of the equation. The following ratios are preferred: 0.5 mole diol, 1.0–1.5 moles reactive solvent, and 0.8–1.5 moles urea.

The reactive solvents that can be employed are alkanols having a boiling point in the range of 64° to 150°, e. g. methyl, ethyl, n-propyl, isopropyl, n-butyl, iso-butyl, amyl and 2-methoxy ethanol. About 0.5 to 3.0 moles of alcohol can be used but 1.0 to 1.5 moles are to be preferred. The moles used are roughly directly proportional to the boiling point of the alcohol. The alkanol is separated from the reaction product as by distillation and can then preferably be recycled to the reaction zone.

The catalysts employed are aluminum alkoxides, the preparation of which is well known. The alkoxide portion is derived from alcohols in the same range and similar properties as the reactive solvent. The quantities of catalyst used range from 0.005 to 0.25 mole per mole of diol.

The combination of reactive solvent plus the catalyst of this invention gives superior results to those obtained without the catalyst and with a non-reactive solvent. This can best be explained by the following equations:

(1)  $NH_2CONH_2 + Al(OR')_3 \longrightarrow$ coordination complex
(2)  Complex $+ R'OH \longrightarrow R'OCONH_2 + NH_3 + (R'O)_3Al$

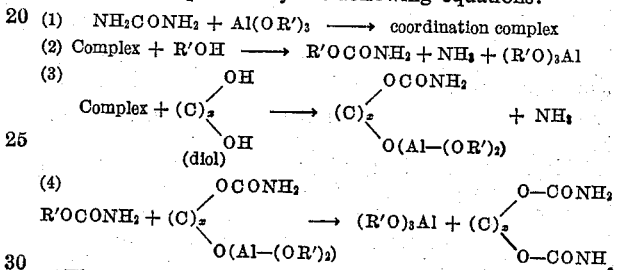

The mechanism presented is believed to be correct but the invention is not intended to be limited thereby.

This invention will be better understood by reference to the following examples of the preparation of the indicated compounds according to the process of this invention.

*Example 1.—Preparation of butane 1,3 diol dicarbamate*

45 gms. (0.5 mole) of butane 1,3 diol, 60 gms. (1 mole) of urea, 110 cc. of n-butanol and 4 gms. of aluminum isopropoxide were charged into a flask. After 6½ hours of refluxing, 94% of the theoretical $NH_3$ was formed. The pot temperature rose from 127° to 151° C. The pressure was lowered gradually to 20 mm. and the butanol removed keeping the pot temperature at 150° C. The crude product was recrystallized from ethanol and had a melting point of 151°–152° C. (literature value 152° C.)

*Example 2.—Preparation of 2-methyl-2-n-propyl propane 1,3 diol dicarbamate*

66 gms. (0.5 mole) of the corresponding diol, 60 gms. (1 mole) of urea, 90 cc. of n-propanol and 4 gms. of aluminum isopropoxide were charged to a reaction flask. 93% of the theoretical $NH_3$ was evolved after 5½ hours refluxing. The pot temperature rose from 120° C. to 158° C. The alcohol was distilled off while the pressure was lowered to 20 mm. while the pot temperature was kept at 150° C. 96 gms. of crude product was obtained which after one recrystallization from xylene had a melting point of 103° C. to 105° C. (literature 104°–105° C.)

*Example 3.—Preparation of 2-methyl-2-n-propyl propane 1,3 diol dicarbamate*

66 gms. (0.5 mole) of the diol, 60 gms. (1 mole) urea, 110 cc. n-butanol and 4 gms. aluminum n-butoxide were charged to the flask. 90% of the theoretical ammonia was formed after 4½ hours of refluxing. The temperature rose from 127° to 156° C. The n-butanol was distilled off by reducing the pressure. The recrystallized product had a melting point of 104.1° to 105.3° C.

Example 4.—Preparation of pentane 1,5 diol dicarbamate 52 gms. (0.5 m.) of pentane 1,5 diol, 63 gms. (1.05 m.) urea, 110 cc. n-butanol and 4 gms. al. isopropoxide were charged. 1.0 m. of $NH_3$, the theoretical amount, was obtained after 5½ hours of reflux with a final pot temperature of 146° C. The butanol was removed by reducing the pressure to 30 mm. The crude yield was 89 gms. which on recrystallization from butanol gave an 85% yield of product having a M. P. of 162.8° to 164.6° C.

It should be noted in this example how an excellent yield of a believed to be novel product was obtained by the process of this invention.

Example 5.—Preparation of 2-butene 1,4 diol dicarbamate 47 gms. (0.54 m.) of the diol, 62 gms. (1.03 m.) urea, 120 cc. n-butanol and 4 gms. al. isopropoxide were charged to the reactor. After 6 hours of reflux the temperature rose from 124° C. to 141° C. and 87% of the $NH_3$ evolved. The pressure was lowered and the butanol recovered. A product having a M. P. of 132.5 to 133.5 in good yield was obtained. This too is believed to be a new chemical.

The organic, e. g., alkanediol dicarbamates dissolve with difficulty in cold water, alcohol or xylene, but depending on molecular weight readily in these media when hot.

This process can be applicable to the reaction of substituted ureas with various diols also.

Alkyl carbamates and alkanediol dicarbamates can also be prepared by the reaction of an alkanol with urea utilizing one of a number of catalysts such as an aluminum alkoxide and cupric acetate in the absence of a solvent. These materials also can be prepared by an ester interchange reaction of an alkanol or diol with a carbamate of a lower boiling alcohol in the absence of a diluent and under reduced pressure.

It is understood that this invention is not limited to the specific examples which have been offered merely as illustrations and that modifications may be made without departing from the spirit of the invention.

What is claimed is:

1. A process for preparing a lower alkanediol dicarbamate which comprises reacting urea with a lower alkanediol at a temperature in the range of about 100° to 180° C. in a reaction zone in the presence of an alkanol reactive solvent having a boiling point in the range of 64° to 150° C. and an aluminum alkoxide derived from an alkanol having a boiling point in the range of 64° to 150° C.

2. The process of claim 1 in which the reaction is carried out at a temperature in the range of about 100° C. to about 160° C.

3. The process of claim 2 in which the alkanediol dicarbamate being prepared is butane 1,3 diol dicarbamate and the alkanediol is butane 1,3 diol.

4. The process of claim 3 in which the alkanol utilized is butanol and the alkoxide is aluminum isopropoxide.

5. The process of claim 2 in which the alkanediol dicarbamate being prepared is 2-methyl-2-n-propyl-propane 1,3 diol dicarbamate and the alkanediol is 2-methyl-2-n-propyl-propane 1,3 diol.

6. The process of claim 5 in which the alkanol utilized is n-butanol and the alkoxide is aluminum n-butoxide.

7. The process of claim 1 including the additional step of separating the alkanol from the reaction product and recycling it to the reaction zone.

8. The process of claim 2 in which the alkanediol dicarbamate being prepared is pentane 1,5 diol dicarbamate.

9. The process of claim 2 in which the alkanediol dicarbamate being prepared is 2-butene 1,4 diol dicarbamate.

10. A process for preparing a lower alkanediol dicarbamate which comprises reacting about 0.8 to 1.5 moles of urea with about 0.5 mole of the corresponding lower alkanediol at a temperature in the range of 100° to 160° C. in the presence of about 1 to 1.5 moles of an alkanol reactive solvent having a boiling point in the range of 64° to 150° C. and about 0.005 to 0.25 mole of an aluminum alkoxide derived from an alkanol having a boiling point in the range of 64° to 150° C. per mole of diol.

References Cited in the file of this patent

UNITED STATES PATENTS

| | | |
|---|---|---|
| 1,817,992 | Leopold et al. | Aug. 11, 1931 |
| 2,197,479 | Meigs | Apr. 16, 1940 |
| 2,724,720 | Berger et al. | Nov. 22, 1955 |

FOREIGN PATENTS

| | | |
|---|---|---|
| 713,467 | Germany | Nov. 12, 1941 |
| 753,127 | Germany | Nov. 24, 1952 |